United States Patent
Bryan et al.

[15] 3,669,293
[45] June 13, 1972

[54] FLEXIBLE LEAF SPRINGS FOR KICKERS AND CLAMPS FOR LOG STACKERS

[72] Inventors: Darrel L. Bryan; Larry D. Maisch, both of Overland Park, Kans.

[73] Assignee: Pacific Car and Foundry Company, Bellevue, Wash.

[22] Filed: June 26, 1970

[21] Appl. No.: 50,032

[52] U.S. Cl. ......................................214/767, 214/147 R
[51] Int. Cl. ..........................................B66f 9/00
[58] Field of Search..................214/147 R, 146 E, 773, 776, 214/510, 654, 778, 767, 140, 147 G

[56] References Cited

UNITED STATES PATENTS

| | | | |
|---|---|---|---|
| 3,519,156 | 7/1970 | Magnuson | 214/778 X |
| 2,958,434 | 11/1960 | Wagner | 214/510 |
| 2,873,874 | 2/1959 | Best et al. | 214/654 |
| 2,786,591 | 3/1957 | Neumeister | 214/510 |
| 2,684,165 | 7/1954 | Hill | 214/654 |

Primary Examiner—Robert G. Sheridan
Assistant Examiner—John Mannix
Attorney—Seed, Berry & Dowrey

[57] ABSTRACT

A material handling vehicle including a load handling head mounted upon the end of a boom, said load handling head including a load carrying platform, a pair of clamping arms and a pair of kicking or platform sweeping arms. The clamping arms, used for retaining the load in place upon the platform, are of a flexible spring material enabling them to equalize pressure on and conform to the irregular loads without damage to the clamps. The pair of kicker arms, likewise of a spring material, are used for removing the loads from the platform and are flexible so that they may exert pressure against unevenly shaped loads without material damage to the "kickers" or load removed.

4 Claims, 3 Drawing Figures

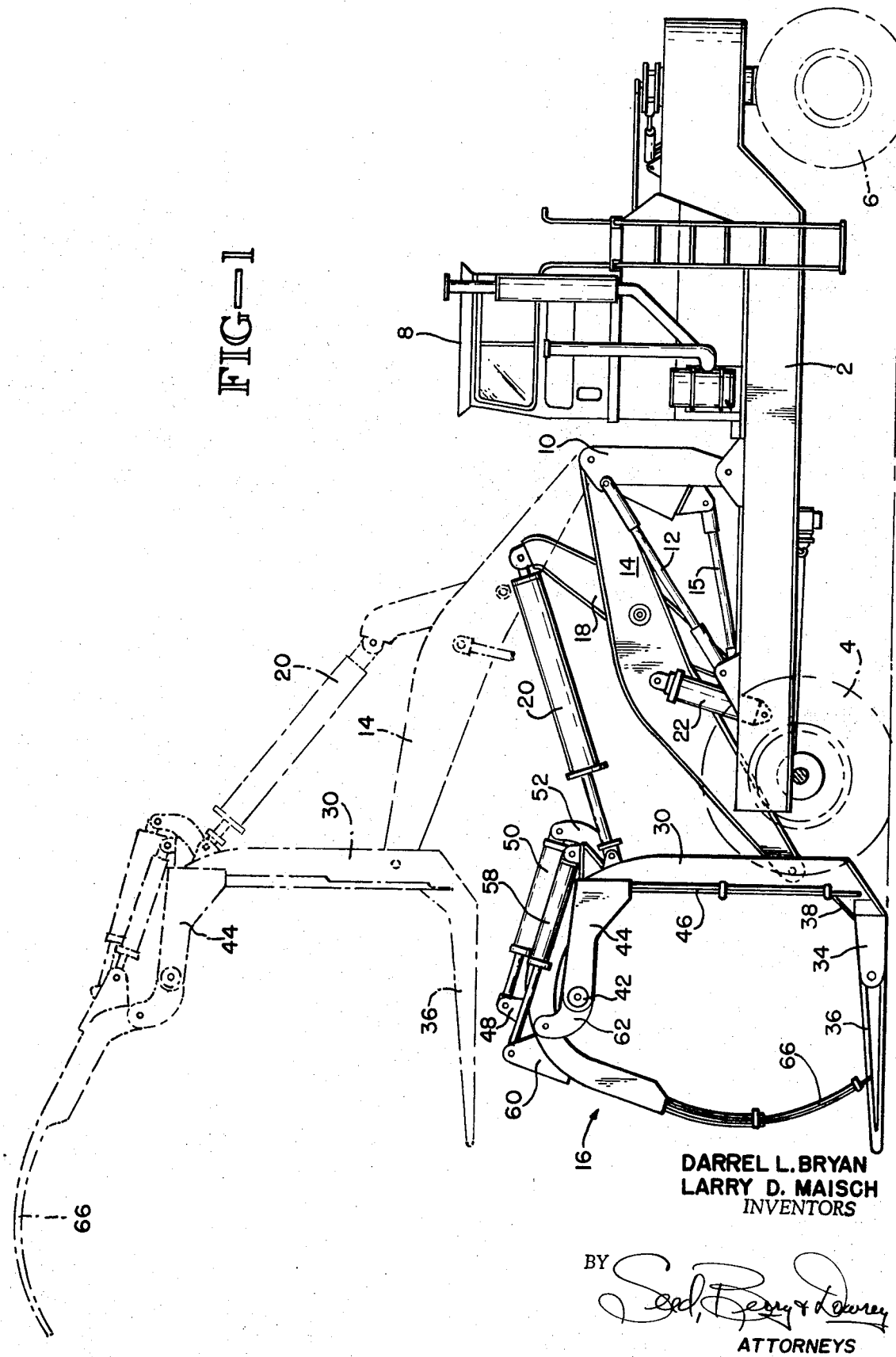

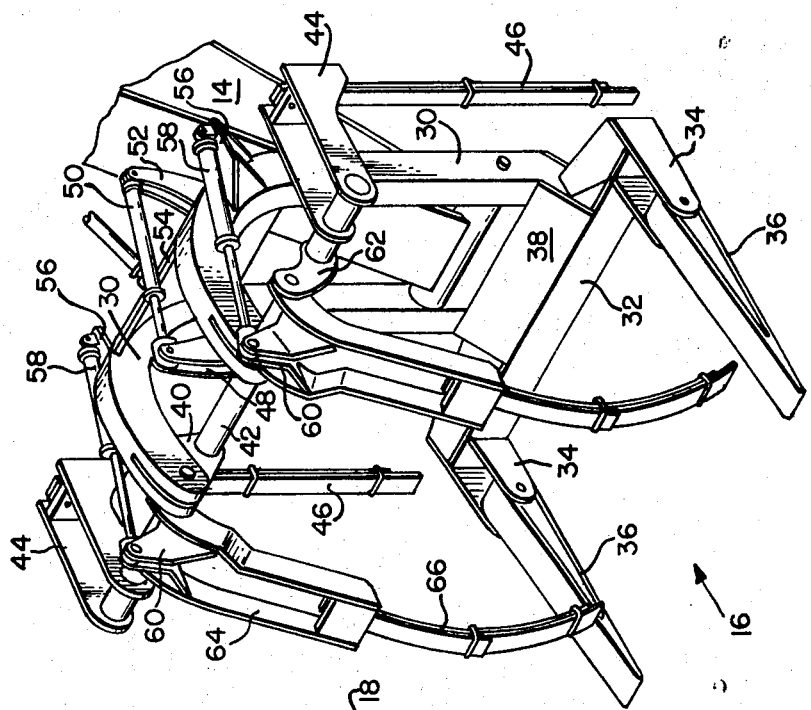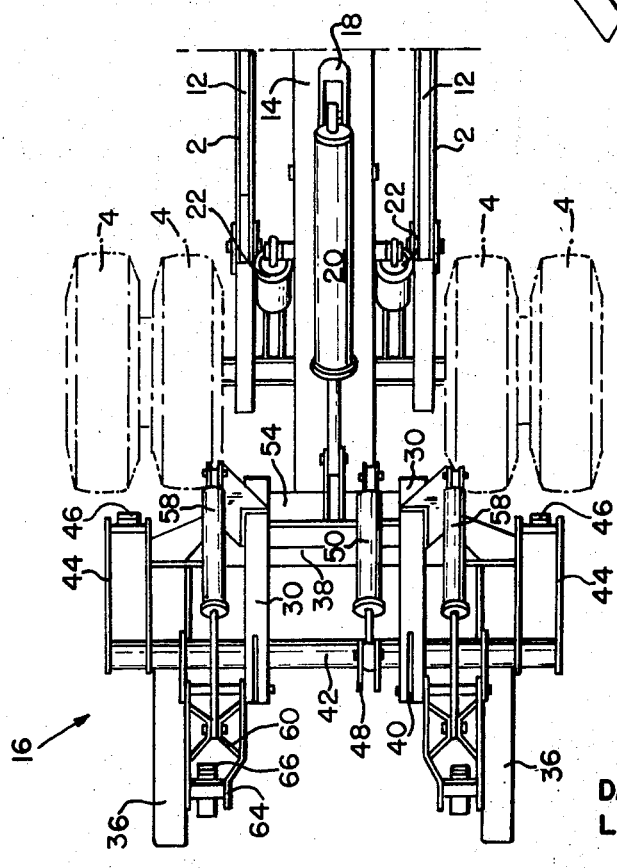

FLEXIBLE LEAF SPRINGS FOR KICKERS AND CLAMPS FOR LOG STACKERS

BACKGROUND OF THE INVENTION

This invention relates to a material handling vehicle intended primarily for the hauling and stacking of logs and particularly, a vehicle of the type disclosed in U.S. Pat. No. 3,352,442, granted Nov. 14, 1967.

Briefly, the vehicle disclosed in the above noted patent is of the type in which the load is carried on a boom structure including parallel motion arms enabling a platform upon which the load is carried to be either tilted or maintained at a given angularity within the limits defined by the structure. The above noted vehicle further includes a pair of clamping arms supported for swinging movement about a horizontal axis for facilitating loading of the platform and keeping the load upon the platform and another set of arms mounted for swinging movement about a horizontal axis designed to permit a sweeper function to facilitate off-loading of the platform.

The invention proposes to provide a vehicle of this character engineered so that it will handle unusually heavy loads of logs which by their very nature have varying dimensions, each log being tapered. Each load comprises a plurality of logs which are not uniformly stacked.

It is an object of the present invention to provide a load handling vehicle wherein the clamping arms used for gripping and holding the load upon a platform as well as the arms used for sweeping the platform to assist in unloading are of a flexible nature enabling them to bend or distort and adjust to variable dimensions of the load without breakage or damage to either the load or the vehicle itself.

Another object of the present invention is to provide a load handling vehicle wherein a pair of clamping arms used for gripping the load are individually controlled allowing adjustment to loads of varying dimensions.

BRIEF DESCRIPTION OF THE DRAWINGS

FIG. 1 is a side elevational view illustrating the material handling vehicle constructed in accordance with the preferred embodiment of the present invention, the material handling head and boom structure shown in two of its possible positions represented in one instance by full lines and the other by phantom lines;

FIG. 2 is a top plan view of the forward end of the vehicle depicted in FIG. 1; and FIG. 3 is a perspective view of the load handling head of that vehicle depicted in FIG. 1.

DETAILED DESCRIPTION OF THE DRAWINGS

The illustrative vehicle is constructed in a conventional manner having an engine and drive line mounted upon a longitudinal main frame 2. A pair of wheels 4 at one end of the main frame serve as traction devices and a pivotally mounted pair of closely adjacent wheels 6 at the other end of the frame perform a steering function. The steerable end will be referred to as the rear end.

At the rear end of the vehicle there is a cab 8 as well as the driving engine and necessary steering mechanism. Mounted to the framework 2 directly in front of the cab 8 is a pair of generally vertically oriented upright beams 10, one mounted on each side of the vehicle to the frame 2. For horizontal stability, each of the upright beams 10 have an angular, forwardly directed support rod 12 which extends from the upper portion of each beam 10 to the framework 2. Pivotally mounted at a position between the two uprights 10 is a boom 14 which extends forwardly to terminate in the load-handling head 16. Pivotally mounted at one end to the lower portion of the upright 10, but above the framework 2, is a forwardly extending control rod 15 which has the other end pivotally mounted to a walking beam 18 which extends in a generally upward direction and has pivotally mounted at the upper portion, the loading head 16. As can be seen in FIG. 1, the arrangement of structural elements hereinabove described, allows the boom 14 to be raised by a pair of generally vertically disposed cylinders 22 mounted between the frame 2 and the boom 14, while keeping the loading head 16 in uniform The loading head, as best seen in FIG. 3, comprises a pair of generally vertically upright main support members 30, having outwardly curved upper portions, pivotally mounted upon the outwardmost or forwardmost end of the boom 14. Rigidly mounted to the lower portion of the uprights 30 is a spanning beam 32 (FIG. 3) which has mounted to the forward surface and at opposite ends thereof, a pair of forwardly extending brackets 34 which have respectively mounted therein a pair of forwardly extending tapered forks 36. The connection between the forks 36 and the bracket 34 is such that the arms are capable of pivoting upwardly only. Mounted to the upper portion of the beam 32 and secured to the uprights 30 is a spanning plate 38 which serves the function of both increasing the structural integrity of the head as well as providing a solid rear surface at the point where the platform joins the uprights 30.

Pivoted to the upper and outwardly extending end of the curved uprights 30 are a pair of downwardly depending support brackets 40 which are rigidly attached to a tubular structure Tube 42 extends laterally outwardly of the uprights 30 as well as spanning the distance therebetween.

Rigidly mounted to the outboard ends of the tube 42 for rotation therewith are a pair of brackets 44 which serve as mounting means for kicker bars 46. The kicker bars 46 are made out of a flexible material such as a plurality of leaf springs as shown such that if the material carried upon the material-handling head 16 is of irregular dimensions, one of the bars 46 can be flexed to accommodate the irregular shape without structural damage.

Rigidly mounted to tube 42 intermediate the curved uprights 30 is an upstanding bracket 48 to which is mounted a hydraulic cylinder 50 which extends rearwardly and is secured at its rearward end to a bracket 52 mounted to a plate 54 (FIG. 2) which extends between the curved uprights 30 at their rearward portion. The operation of the kicker bars 46 is instituted by activating the cylinder 50 which will move the bracket 48, turning the tube 42 and its mounting brackets 40, causing brackets 44 and attached flexible kicker bars 46 to pivot about the axis of the upper and outwardly extending ends of the curved uprights 30. The movement of the bars 46 forces anything located upon the platform off the forward end thereof.

Mounted upon the outside of the upper portion of the curved uprights 30 are a pair of platforms 56 which support one end of a pair of independently activated double-acting air motors or hydraulic rams 58 which are attached at their other end to upstanding brackets 60 rigidly attached to a pair of clamping arms. The clamping arms are pivotally mounted between the outermost end of the curved uprights 30 and brackets 62 which are mounted upon tube 42 outwardly of the curved uprights 30 but inboard of the kicker bar mounting brackets 44. The clamping arms themselves comprise two integrated elements, the first of which is a rigid metallic arm member 64 pivotally mounted as noted above, the second of which is a downwardly extending spring steel arm 66 rigidly connected to arm 64. The use of the downwardly extending spring steel arms 66 enables the clamping arms to firmly grasp material of uneven dimensions without undue stress and breakage occuring to the structural elements. The fact that the air motors or hydraulic rams 58 are independently operated allows greater securing pressure to be used on one arm than on the other.

In operation, the loading head described in detail above, operates in a standard fashion whereat the air motors or hydraulic cylinders 58 are activated to lift the gripper arms upwardly leaving an open space at the loading head. The entire vehicle is driven forwardly forcing forks 36 under the material intended to be lifted, the material being forced back against the uprights 30. Once the load is so located, the clamping arms are again activated and pivoted downwardly to hold the material in place on the platform. When it is desired to remove the material, the entire platform is tilted forwardly and the kicker arms are activated sweeping the platform of all material carried thereupon.

It is to be understood that although the operation of the clamping arms 66 and the kickers 46 may well be independent, it is well within the scope of this invention to provide valving such that the kickers 46 may not be operated unless the clamping arms are simultaneously raised. The valving required is considered to be well within the scope of one skilled in the art and so is not shown or described.

The embodiments of the invention in which an exclusive property or privilege is claimed are defined as follows:

1. In combination with a vehicle main frame; a mounting beam secured to the frame, a boom pivoted at its inner end to the upper end of the beam for vertical swing movement about a transverse horizontal axis, a load handling head pivoted at its lower end to the outer end of the boom for vertical tilting movements, an upright walking beam fulcrumed to the boom intermediate the ends thereof for rocker movement about an axis parallel to the axis of swing of the boom, a fixed length link pivotally secured at one end to the lower end of the walking beam and at its opposite end pivotally secured to a point upon the mounting beam, an extendible link pivotally secured to the upper end of the walking beam and to the upper end of the load handling head, means for raising and lowering said boom, said load handling head comprising forwardly extending load handling forks terminating in a rigid vertical member at the rearwardmost end of said forks and powered forwardly extending load clamping means and means pivotally securing the latter to and forwardly of the upper portion of the vertical member, said load clamping means comprising generally downwardly extending rearwardly curved flexible load contacting laterally spaced arms each fabricated of a plurality of leaf spring elements of different lengths such that the arms are increasingly more flexible as the distance from the pivot means becomes greater whereby the free ends of the spring elements extend substantially to the forks in clamping position so as to clamp the load between the spring elements and the vertical member, said spring elements independently flexing to accommodate irregular objects.

2. A combination as in claim 1 wherein each of the arms is independently operated.

3. A combination as in claim 1 wherein there is further included a powered pivotable flexible kicker means for sweeping the load from the forks.

4. A combination as in claim 3 wherein the clamping means simultaneously releases upon operation of the kicking means.

* * * * *